Oct. 11, 1927.
F. L. ALBEN
1,645,272
DRIVE MECHANISM FOR ELECTRIC LOCOMOTIVES
Filed March 1. 1924
2 Sheets-Sheet 2
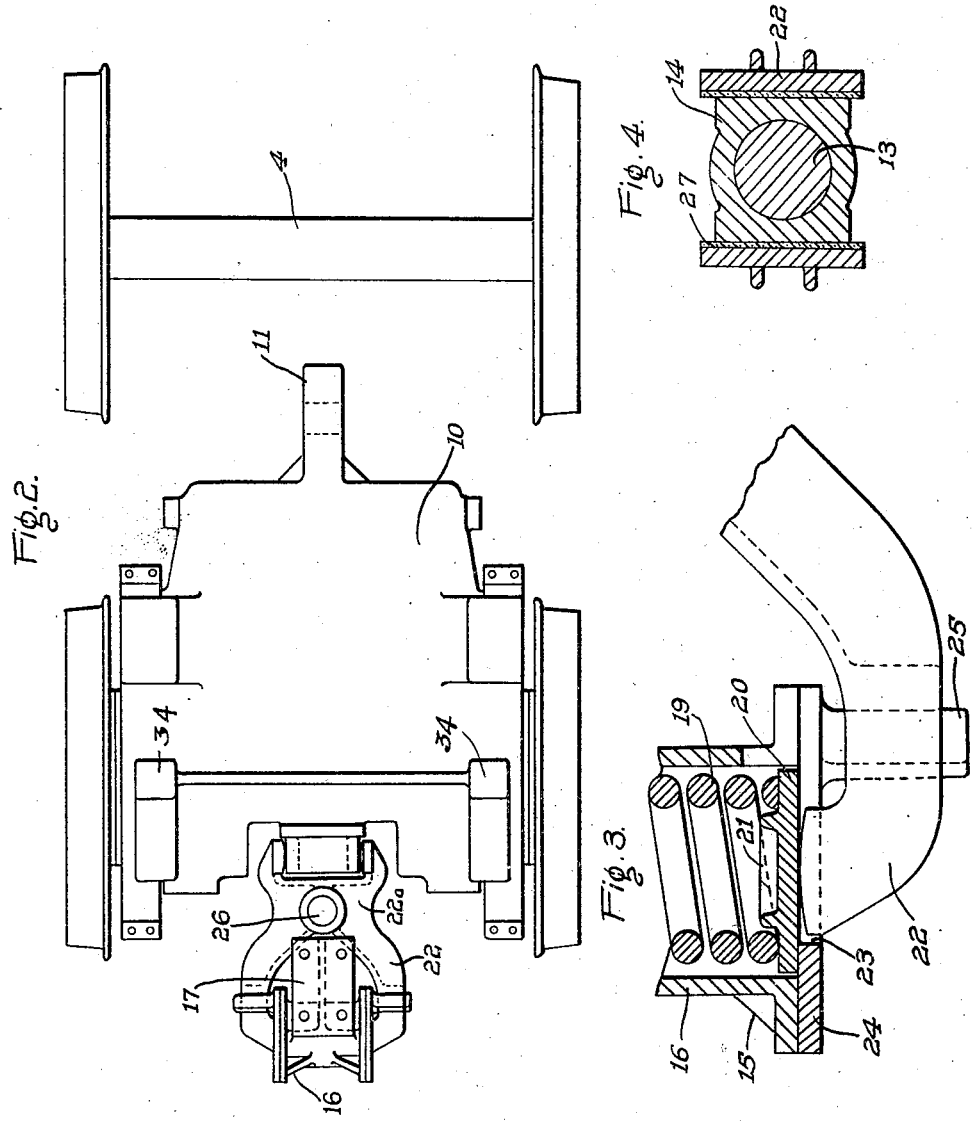
WITNESSES:
A. G. Schiefelbein
M. B. Jaspert
INVENTOR
Frank L. Alben.
BY
Wesley G. Carr
ATTORNEY Patented Oct. 11, 1927.

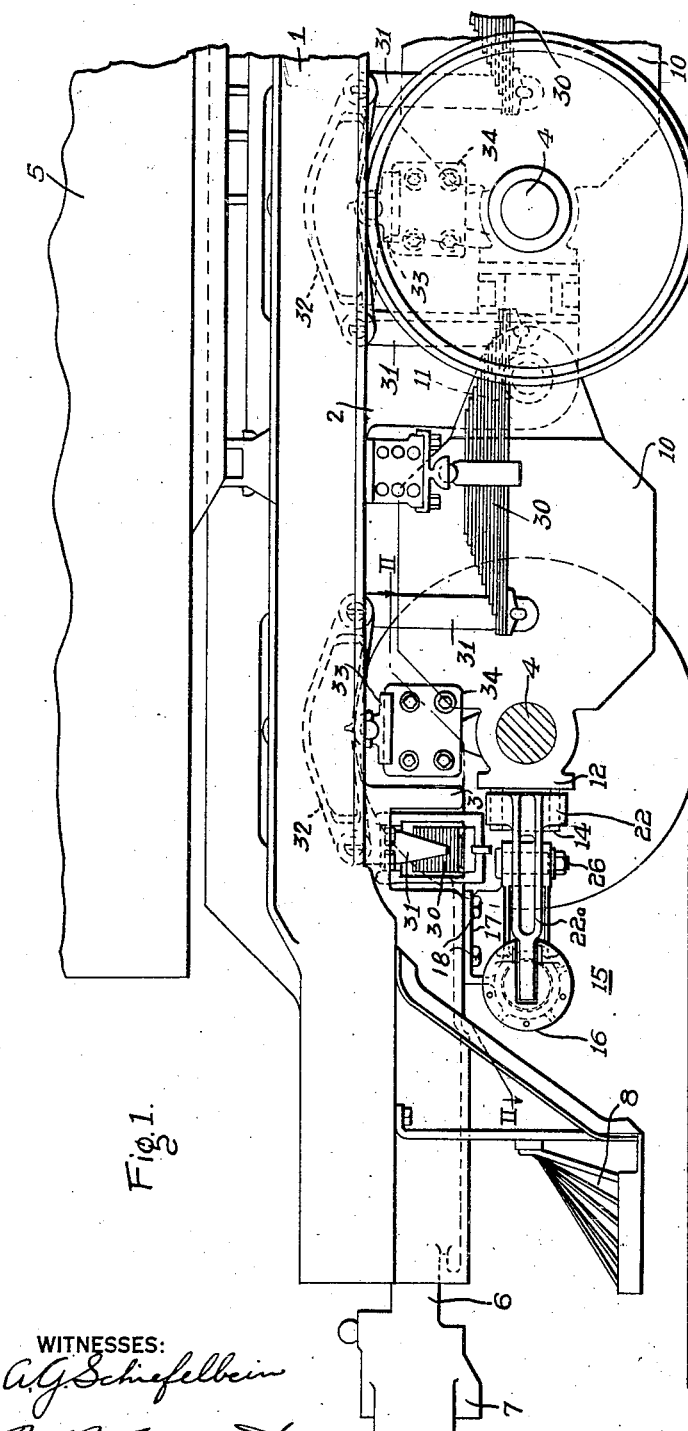

1,645,272

UNITED STATES PATENT OFFICE.

FRANK L. ALBEN, OF WILKINSBURG, PENNSYLVANIA, ASSIGNOR TO WESTINGHOUSE ELECTRIC & MANUFACTURING COMPANY, A CORPORATION OF PENNSYLVANIA.

DRIVE MECHANISM FOR ELECTRIC LOCOMOTIVES.

Application filed March 1, 1924. Serial No. 696,176.

My invention relates to railway vehicles, more particularly to a method of mounting a drive mechanism of electric locomotives.

It is among the objects of my invention to provide a lateral restraining device for vehicles which will maintain the axle with which it is associated parallel with other axles, when the vehicle is operating on straight or tangent track.

It is still another object of my invention to provide a lateral restraining device, so that positive steering will be effected, when the locomotive is operating on a curved track for the purpose of centering the locomotive when approaching normal operation on tangent track.

It is still another object of my invention to adapt the front pair of driving wheels to the purpose of steering the locomotive around curves, and causing the front drivers to act as a leading truck.

It is a still further object of my invention to provide a restraining device of the above-indicated character which shall be readily adapted to be used upon the vehicle without requiring special construction of the vehicle body and which shall function efficiently for the purpose set forth above.

In railway vehicles of the type where the side frame members are dispensed with, the motors are usually secured to a longitudinal girder constituting the vehicle frame by supporting one end of the motor frame on the drive axles and suspending the other end of the motor from the girder member. Generally the motors are pivotally mounted on the girder to permit vertical movement of the wheel axles relative to the frame, which is usually spring-borne on the wheel axles.

In the accompanying drawing constituting a part hereof and in which like reference characters designate like parts:

Fig. 1 is a view in side elevation of a fragmentary portion of a front or rear end of a vehicle, embodying the principles of my invention, Fig. 2 is a plan view thereof taken along the line II—II of Fig. 1, Fig. 3 is a plan view, partially in section, of a portion of the restraining mechanism, and Fig. 4 is a view in cross-section of the wearing shoe or slide member which effects co-operative engagement of the restraining device with the motor housing.

Referring to Fig. 1, the vehicle therein illustrated comprises a longitudinal center frame 1 having vertically depending portions 2 and 3 that are provided with means for journalling the frame upon a plurality of wheel axles 4. A vehicle body 5 is supported on the frame 1 and a draw bar 6 having a coupling member 7 is provided in the end of the frame in the usual manner. A pilot 8 is secured to the under side of the frame 1 in any suitable manner.

Each of a plurality of motors 10 has one end of its frame journalled upon one of the axles 4 while the other end 11 is universally supported upon the corresponding depending web portion 2 of the vehicle, to permit universal movement of the motor and wheel axles relative to the frame 1. An equalizing system, comprising the usual springs 30, links 31 and equalizing levers 32, is provided for supporting the weight of the frame 1 and the vehicle body 5 on the wheel axles 4. The equalizing levers 32 are provided with bearing plates 33 that cooperate with bearing pads 34 mounted directly above the wheel axles 4 on the frames of the motors 10 in such manner that the plates 33 are free to slide upon the pads 34. Because of the sliding engagement of the bearing plates and pads, the end axles and motors are free to pivot in a horizontal plane about the universally connected end 11. This method of mounting the motors adapts the end driving wheels to act as guide trucks for the locomotive. The journalled ends of the motors are each provided with an extension bracket 12, the end of which has a trunnion member 13, Fig. 4, formed integrally therewith, which is adapted to be rotatably mounted in a block 14.

A restraining mechanism 15 comprising a cylindrical member 16 (Fig. 3) is provided with a mounting bracket 17 by which it is adapted to be secured to the under side of the frame 1 through the agency of a plurality of bolts 18. A helical or coil spring 19 is disposed in the cylinder 16, and contact plates 20 each having an annular locating boss 21 are disposed in the ends of the spring to respectively constitute seating portions for the arms 22 of a pivot link or yoke 22a, which extend through openings 23 that are provided in the end plates 24 of the cylinder. The end plates 24 are provided with laterally projecting portions 25 that co-operatively engage or guide the arms 22.

The bracket 17 of the cylinder 16 is provided with an opening that is adapted to receive a pivot bolt 26 for pivotally mounting the yoke 22a, and the expanded ends of the member 22a are adapted to engage the block 14 of the end motor, as shown in Fig. 1. The contacting ends of the pivot yoke arms 22 are provided with liners 27 of material possessing durable wearing qualities, such as manganese alloy, to prevent abnormal wearing of their engaging portions.

Engagement of the arms 22 with the block 14 is such as to permit relative vertical movement of the motor without bending or distorting the restraining mechanism, and the connection of the block 14 with the trunnion 13 permits of rotative movement of the motor, which further prevents binding or strain on the pivot yoke arms 22.

The restraining device is associated with both the front and the rear motor of the vehicle to provide relative steering action between the vehicle body and axles; and the function of the mechanism is such that when thrust is exerted on the wheel flanges, the vehicle frame is swung by virtue of the centrifugal force exerted thereon, which produces lateral movement of the arms 22 against the coil spring 19. This spring is reacted upon by the motor 10 and the wheel axle 4, thus tending to absorb the thrust and maintain equilibrium and proper alinement of the wheel axle.

It is evident from the foregoing description of my invention that a yielding restraining mechanism such as is described herein provides an efficient and simple means for laterally restraining the vehicle body relative to the wheel axles and rails.

Although I have described a specific embodiment of my invention, it will be obvious to those skilled in the art that various modifications may be made in the details of construction and the design and proportions of the several cooperating parts, as by substituting a liquid pressure device in place of the spring element, without departing from the principles herein set forth.

I claim as my invention:

1. The combination with a railway vehicle body and a wheeled support therefor, of a yielding restraining mechanism, said mechanism comprising a helical spring member secured to the vehicle and a co-operating pivot yoke associated therewith and adapted to engage said support.

2. The combination with a railway vehicle body and a wheeled support therefor, of a yielding restraining mechanism, said mechanism comprising a helical spring member secured to the vehicle and a co-operating pivot yoke associated therewith and adapted to slidingly engage said support.

3. The combination with a railway vehicle body, of a plurality of motors therefor, said motors being journalled on the wheel axles, and a yielding restraining mechanism comprising a resilient member secured to the vehicle body, a guide block pivotally mounted on the motor frames and a pivot yoke co-operatively engaging said resilient member and said guide block.

4. The combination with a railway vehicle body of a motor journalled on a driving axle, and a yielding restraining mechanism comprising a resilient member secured to the vehicle body, a guide block pivotally mounted on the motor frame, and a pivot yoke co-operatively engaging said resilient member and said guide block.

5. In a railway vehicle, a lateral restraining device comprising a cylindrical member, a helical spring within said member, contact plates in the ends of said cylindrical member, said plates being adapted to confine the spring within the cylinder and to serve as bearing plates, and a pivoted link in engagement with said bearing plates and adapted to engage the supporting structure of the vehicle.

6. In a railway vehicle, a lateral restraining device comprising a yoke having parallel arms at each end pivoted to the vehicle body, a resilient member secured to the vehicle body and adapted to be engaged by the arms at one end of the yoke, and a trunnion on the vehicle truck adapted to be engaged and laterally restrained by the arms at the other end of the yoke.

In testimony whereof, I have hereunto subscribed my name this 4th day of February, 1924.

FRANK L. ALBEN.